Figure 1:
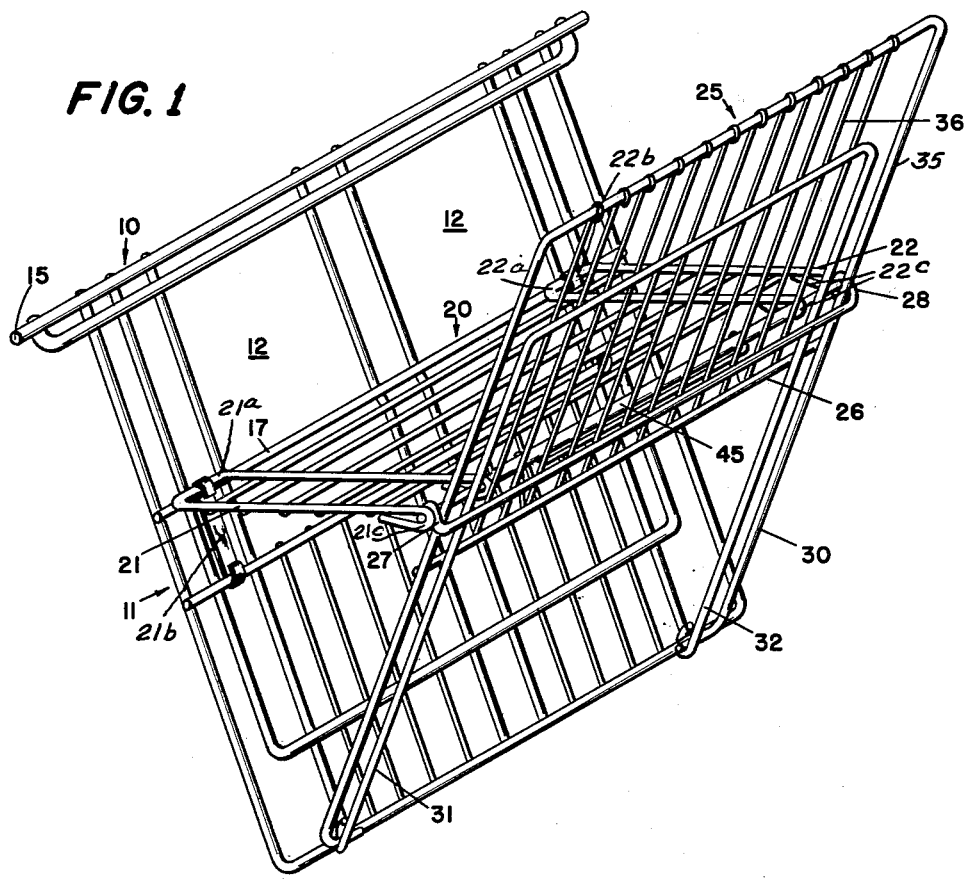

Nov. 17, 1964  R. G. HUMMER  3,157,410
SHOPPING CART SEAT

Filed Nov. 21, 1962  2 Sheets-Sheet 1

INVENTOR
RALPH G. HUMMER
BY Ralph J. Bassett
ATTORNEY

Nov. 17, 1964   R. G. HUMMER   3,157,410
SHOPPING CART SEAT

Filed Nov. 21, 1962   2 Sheets-Sheet 2

INVENTOR
RALPH G. HUMMER
BY *Ruth J. Bassett*
ATTORNEY

United States Patent Office 3,157,410
Patented Nov. 17, 1964

3,157,410
SHOPPING CART SEAT
Ralph G. Hummer, Oklahoma City, Okla., assignor to Folding Carrier Corporation, Division of Union Asbestos & Rubber Company, Oklahoma City, Okla.
Filed Nov. 21, 1962, Ser. No. 239,222
4 Claims. (Cl. 280—33.99)

This invention relates to collapsible seat structures, more particularly to collapsible seat structures of the type utilized in connection with shopping carts to permit selective adaptation of the cart to accommodate a child.

The development of "supermarket" self-service merchandising techniques has given rise to a shopping cart implementing the facility with which a shopper may select merchandise during the course of a shopping tour. The housewife burdened with small children often finds it desirable to place the child within the cart, where the child can be observed, and kept out of mischief. Since it is undesirable to have the capacity of the cart diminished, as would occur by a child sitting within the merchandise receiving receptacle, baby seat structures have been developed, offering minimal interference with the merchandise receiving capacity of the cart and serving to restrict the child's movement to an area within reach of the shopper. These carts provided with baby seats are often utilized by those not accompanied by children, in which case it would be desirable to collapse the seat structure so as to eliminate its interference with cart capacity. To this end a variety of collapsible seats have been evolved. The facility with which the seat may be collapsed, however, usually diminishes with time since the carts are subjected to rather rigorous use, and abuse, deleteriously affecting the hinging between relatively collapsible components.

It is with the above problems and desiderata in mind, that the present novel baby seat structure has been evolved, a seat structure serving to minimize the deterioration to which collapsible seats in shopping carts are normally subjected, and thereby improving the facility with which the seat may be collapsed when not in use.

It is accordingly among the primary objects of this invention to provide an improved seat structure for use in a shopping cart.

Another object of the invention is to provide an improved collapsible seat structure for use in a shopping cart.

It is also an object of the invention to minimize the wear and tear in a shopping cart provided with a collapsible baby seat arising from the opening and closing of the seat.

An additional object of the invention is to provide a collapsible seat structure which may be collapsed with great facility when desired.

These and other objects of the invention which will become hereafter apparent are achieved by provision of a seat member adapted for pivotal securement to the end gate of a shopping cart. A back member is pivotally secured to the end gate at a point beneath the point of pivotal securement of the seat so that upon pivotal movement of the back member towards the end gate the seat member will be collapsed. There is sliding movement between the seat member and the back member, and a novel bearing is interposed between the seat member and the back member to implement this sliding movement with a minimum of erosion or other damage to the seat member or back member. A constraining bail is pivotally secured to the seat member extending around the back member serving as a limiting guide to restrict the movement of the back member, and permit collapse of the seat and back member into a minimal volume as will become hereafter apparent.

An important feature of the invention resides in the arrangement of the novel bearing to implement sliding between the seat and the seat backs with the novel bearing providing rolling friction in lieu of the conventionally encountered sliding friction thereby minimizing galling and pitting between sliding parts.

Another feature of the invention resides in the formation of the seat end as a pivoted bail member surrounding the back so that when the seat is in a raised position the constraining bail may collapse inobtrusively against the seat back.

Figure 2:
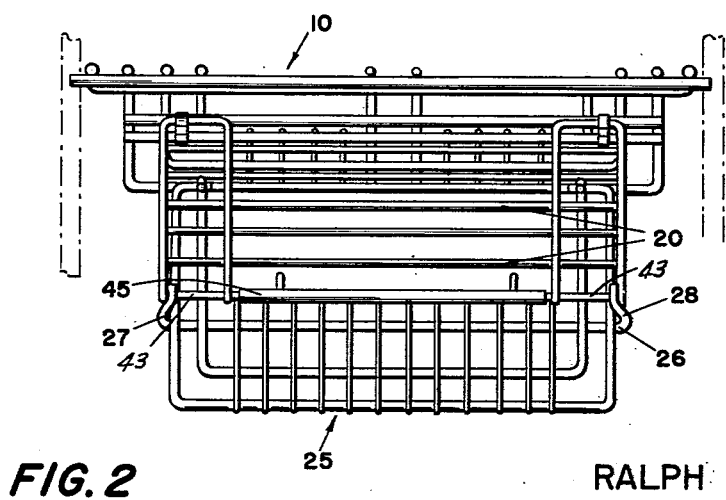
Figure 3:
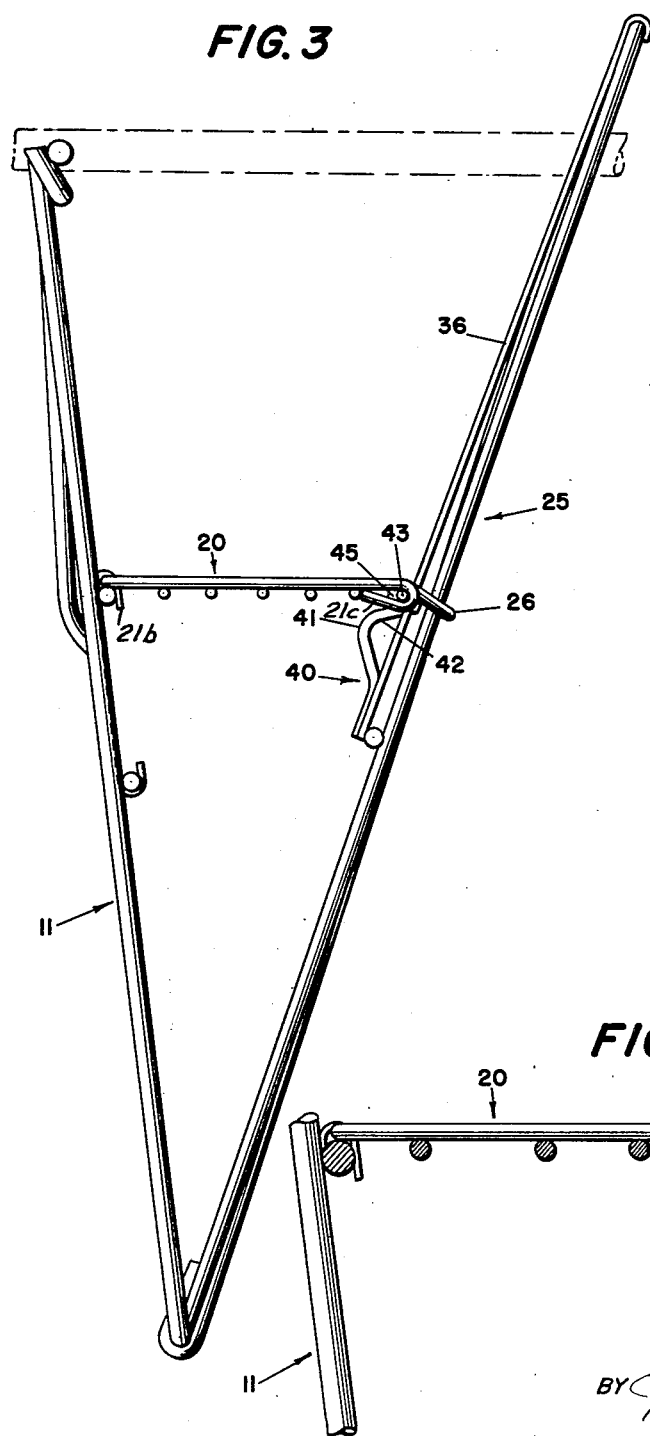
Figure 4:
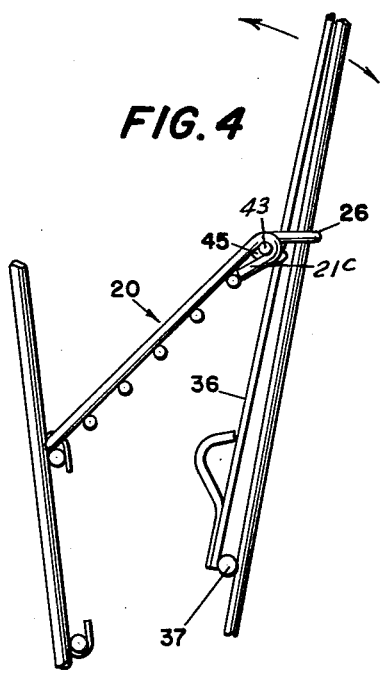
Figure 5:
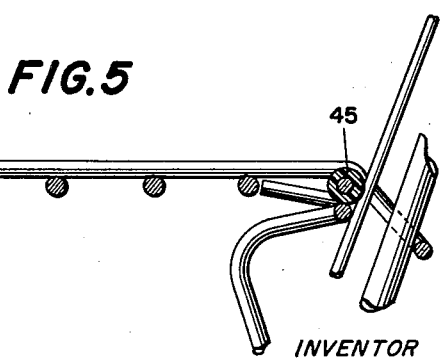

The specific details of an exemplary embodiment of the invention, and their mode of functioning, will be made most manifest and particularly pointed out in clear concise and exact terms in conjunction with the accompanying drawings wherein:

FIG. 1 is a perspective view of a novel baby seat for use in connection with a shopping cart illustrating the details of the seat member and back when in operative position; and FIG. 2 is a top plan view looking down at the seat of FIG. 1 in its operative position; and FIG. 3 is a side elevational view of the seat structure shown in FIG. 1 in open position; and FIG. 4 is a detail of a side elevational view showing the seat as it is being collapsed; and FIG. 5 is a detail of a view of the seat member showing how it is abutted against its limiting stop when the seat is in open operative position.

Referring now more particularly to the drawings, like numerals in the various figures will be employed to designate like parts.

As best seen in FIG. 1 the novel seat structure 10 is formed by providing the end gate 11 of a conventional nesting shopping cart with leg holes 12, two of which are here shown. It will be apparent to those skilled in the art that the number of leg holes may be varied without departing from the scope of this invention to provide accommodation for two or more children. Hinge bar 15 extends across the top of end gate 11 and is adapted for suitable pivotal mounting with respect to the frame of the shopping cart in a conventional fashion that will be understood by those skilled in the art.

A seat pivot bar 17 extends transversely of gate 11 and is spaced downwardly from hinge bar 15 at a point beneath the usable area of leg holes 12 defined in the end gate. A seat member 20 is formed of the conventional mesh of welded wires as viewed in the drawing and is hingedly mounted on pivot bar 17. The seat member 20 includes a pair of spaced end wires 21 and 22 overlying the longitudinally extending wires of the mesh structure and welded to the latter to retain the assembly as a unit structure. The spaced pair of wires 21 and 22 are connected at their outer ends 21a and 22a and these connecting portions are hinged to the gate by hinges 21b and 22b. The opposite or inner ends of the spaced pairs of wires 21 and 22 are looped at 21c and 22c about the slide rod 43 defining the inner end portion of the seat assembly.

Pivoted upon the slide rod 43 between lateral end wire loops 21c and 22c and embracing back member 25 is bail 26 having ears 27 and 28 arranged adjacent lateral members 21 and 22 respectively. The length of ears 27 and 28 is such as to permit bail 26 to pivot freely and at the same time limit or constrain the movement of the seat with respect to the back member 25. Back member 25 is formed with seat back frame 30 including pivot legs 31 and 32 secured at their lower extremeties for pivotal movement with respect to end gate 11. Back member 25 is formed with seat back 35 at some point towards the upper end of back frame 30. It will be noted that the seat back is formed with a greater inclination with respect to seat 20 by securing the vertical wires 36 thereof over horizontal lower seat back wire 37.

Stops 40 as best seen in FIGS. 3, 4, and 5 are secured to the seat back frame to limit the downward movement of the seat 20 with respect to the back member 25. Stop 40 is formed with a hump 41 serving to provide a relatively resilient stop surface 42 against which the bearing of slide rod 43 on seat 20 may bear.

Slide rod 43 is the forwardmost rod of the mesh forming the seat 20 and bears against the seat back as the seat moves upwardly and downwardly with respect to the seat structure. In order to implement the sliding movement of the slide rod and seat with respect to the back, an improved bearing 45 in the form of a roller sleeve such as nylon or the like is secured for rotative movement with respect to the slide bar 43 to provide desired rolling friction between the seat and the seat back when relative movement occurs between these components.

Operation

The afore-described novel seat structure is utilized to implement the carrying of a child in a merchandise cart utilized by shoppers in a super market operation. When the shopper is accompanied by a child, the seat 10 is opened by the shopper gripping the top of back member 25 and pushing same forwardly into the cart, and as back member 25 moves forwardly, slide rod 43, riding on bearing 45 moves along vertical seat back wires 36 to a limiting position against stops 40. The spring action of stop surface 42 takes up any slack load produced by the stopping of the seat in its downward movement.

In the downward position of seat 20 as seen in FIGS. 1 and 3 a child may readily be accommodate in the cart.

If the seat is to be collapsed as during storage, the back is brought back against end gate 11, with the bearing 45 on slide rod 43 riding up vertical seat back wires 36 thus sandwiching the seat 20 between end gate 11 and back member 25. In this collapsed position the bail 26 lies inobtrusively against back frame 30.

It is thus seen that an improved collapsible baby seat structure for use in shopping carts has been provided subject to ready collapse and operative positioning with relatively moving parts subject to minimum wear.

The above disclosure has been given by way of illustration and elucidation and not by way of limitation and it is desired to protect all embodiments of the herein disclosed inventive concept within the scope of the appended claims.

What is claimed is:
1. A collapsible seat structure comprising a wall member having apertures forming leg holes arranged therein, a hinge rod fixed to the wall member adjacent the base portion of the leg holes, a seat member hingedly secured to said hinge rod at the base of the leg holes, a back member of substantially planar form pivotally secured at its lower extremity to said wall member, said seat member including a slide rod at its inner marginal edge, said slide rod including a rotatable bearing surface and being positioned to lie adjacent said back member and to travel therealong when the parts are relatively moved, a freely pivoted bail member embracing said back member and having its terminals projecting inwardly and pivotally connected to said slide rod, and a pair of spaced end wires overlying and fixed to said seat member at each end portion, said wires being looped at their inner ends about said slide rod at each side of said bail terminals to prevent displacement of the latter.

2. The structure of claim 1 characterized in that the pair of spaced end wires overlying and fixed to the seat member at each end portion of the said member include a connecting structure at their outer end portions and the hinge means connecting the seat with the rod at the base of the leg holes engages about the connecting structure.

3. The structure of claim 1 characterized in that the back member includes a body engaging angular surface having at its lower portion resilient stop members for limiting the downward movement of the seat.

4. A collapsible seat structure as in claim 1 in which said rotatable bearing surface comprises: a sleeve of a material having a relatively low coefficient of friction with respect to steel.

References Cited by the Examiner
UNITED STATES PATENTS

| | | | |
|---|---|---|---|
| 2,775,793 | 1/57 | Cotchett | |
| 2,896,959 | 7/59 | Young et al. | 280—33.99 |
| 2,931,662 | 4/60 | Young | 280—33.99 |
| 2,998,978 | 9/61 | Sides | 280—33.99 |

FOREIGN PATENTS 1,194,860  5/59  France

A. HARRY LEVY, *Primary Examiner.*